(No Model.)

C. M. DAVIS.
TURNING MACHINE.

No. 514,215. Patented Feb. 6, 1894.

WITNESSES:
Thos. H. Seely
Chas. N. Gooding

INVENTOR:
Charles M. Davis,
by his attorney.
Edward S. Beach

UNITED STATES PATENT OFFICE.

CHARLES M. DAVIS, OF BOSTON, MASSACHUSETTS, ASSIGNOR OF ONE-HALF TO ASHER A. WHITE, OF SAME PLACE.

TURNING-MACHINE.

SPECIFICATION forming part of Letters Patent No. 514,215, dated February 6, 1894.

Application filed May 3, 1893. Serial No. 472,882. (No model.)

*To all whom it may concern:*

Be it known that I, CHARLES M. DAVIS, of Boston, in the county of Suffolk and State of Massachusetts, have invented a new and useful Improvement in Attachments for Turning-Machines, of which the following is a specification, reference being had to the accompanying drawings, in which—

Figure 1:
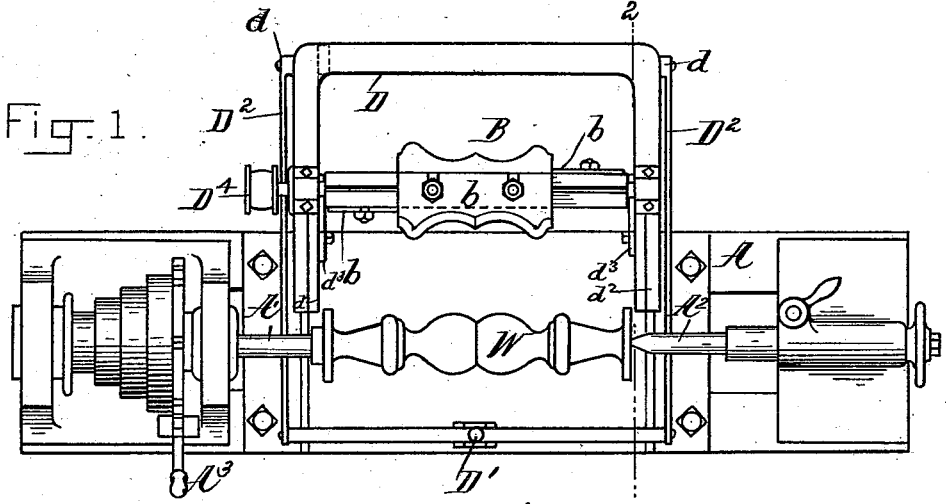
Figures 2, 4, 5:
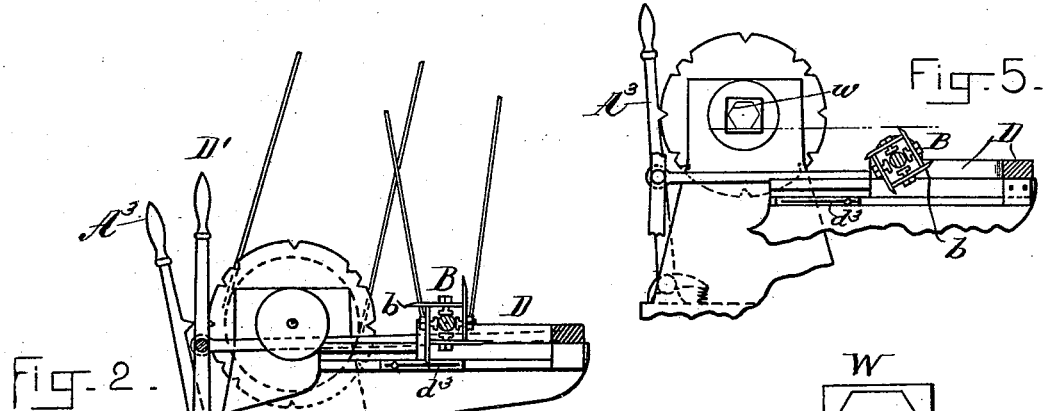
Figure 3:
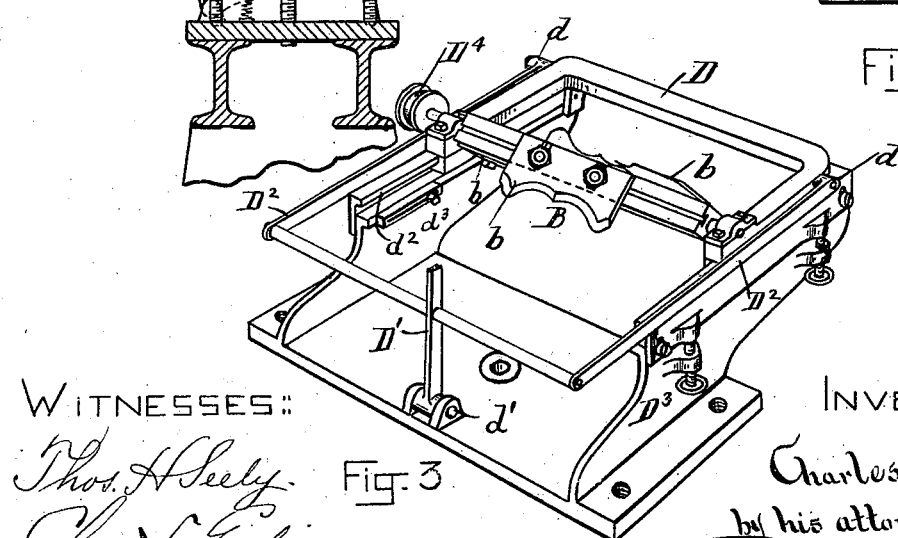

Figure 1 is a plan of a machine embodying my invention, only so much, however, of the old structure being shown as suffices to show the connection of my invention therewith. Fig. 2 is a sectional elevation on line 2—2 of Fig. 1; but also shows the preferred method of belting up. Fig. 3 is a perspective of the preferred form of my new tool-frame. Fig. 4 is an end view of unturned stock marked for turning into product polygonal in cross-section. Fig. 5 shows the stock in place for turning into product polygonal in cross-section.

The object of my invention is to produce an improved machine for turning irregular forms, especially in wood; and my invention consists in the constructional features set forth and claimed herein.

In the drawings, illustrating that embodiment of my invention which I deem the best for adapting to wood-turning, A is the bed or frame; A' the live head-stock, and $A^2$ the tail-stock of an ordinary wood-turning lathe. In some cases I employ a clutch $A^3$ or equivalent device for preventing the rotation of the work. In either case, however, the parts A', $A^2$ serve as a work-holder.

B is a rotary cutter-head provided with blades $b$, of any desired configuration on their cutting edges. Cutter-head B reciprocates toward and from the work, and to accomplish this most readily, I journal cutter-head B in a reciprocating carriage D; and, in order that the workman may have the cutter-head under his control, connect it to a hand-lever D' by a swinging frame $D^2$ loosely pinned to carriage D at $d\ d$. Hand-lever D' is best loosely pinned at $d'$ to frame $D^3$ which is formed with tracks $d^2$ (preferably, vertically adjustable) for carriage D. Adjustable stops $d^3$ are best provided to limit the movement of carriage D toward work W. I employ frame $D^2$ and hand-lever D', because the carriage is thereby moved more quickly than it could be by a screw, so that the workman is enabled to instantly adjust the cutter to the stock by moving the cutter from or toward the work according to the "feel" of the stock operated on. The work W is ordinarily between the cutter-head and hand-lever, and the workman is enabled to pull the cutter up to the work and move it away therefrom, whenever necessary, readily and quickly; and by the use of my invention is enabled to turn irregular forms with a single tool, for such in truth is the cutter-head. The cutter-head may be rotated by belting its pulley $D^4$ to the shaft to which the live head-stock is belted.

If it is desired to turn out work which is polygonal in cross-section, I ship the belt of the live-head stock and clutch that head stock or otherwise turn it into a dead head-stock. The work is then stationary between the puppets, and the work brings up the cutter-head to cut away the surplus stock outside each guide-line $w$, on the end of the stock (see Fig. 4). When the stock is cut down to one guide-line, the clutch is loosed, the work rocked properly between the puppets, the clutch secured, and the cutter-head moved to cut down to the next guide-line; and so on until the turning is completed.

One great advantage of my invention is that irregular forms may be turned by woodworkers without use of the considerable variety of tools now required in producing a product differing in cross-sectional diameters and surface configuration. For the best results, frame D should be vertically adjustable so that the blades may engage the work at a higher or lower horizontal plane as desired, and I consequently prefer to make the tracks $d^2$ adjustable.

The combination of the frame composed of the base-plate and projecting arms with a reciprocating cutter-carrier and cutter journaled therein with means, broadly considered, for actuating the cutter-carrier is not broadly claimed herein but is so claimed in my application, Serial No. 486,890, filed September 30, 1893. In this application Serial No. 472,882 I limit myself to the specific mechanism herein set forth for actuating the cutter-carrier.

What I claim is—

In an attachment for turning lathes, the combination of a main frame $D^3$ provided with tracks $d^2$ with a reciprocating carriage D moving on tracks $d^2$; a rotary cutter journaled in said carriage D; a swinging U-shaped frame $D^2$ the legs of which are fulcrumed to carriage D; a lever $D'$ fulcrumed to main frame $D^3$ and engaging the swinging frame $D^2$, the carriage D being moved whenever the lever $D'$ is moved, all substantially as and for the purpose set forth.

CHARLES M. DAVIS.

Witnesses:
EDWARD S. BEACH,
THOMAS JOHNSON.